Dec. 15, 1942.   E. A. WHITE   2,305,212
FRUIT SIZING MECHANISM
Filed March 20, 1940    5 Sheets—Sheet 1

INVENTOR
Edward A. White
BY
Carl H. Crawford
ATTORNEY

Dec. 15, 1942. E. A. WHITE 2,305,212
FRUIT SIZING MECHANISM
Filed March 20, 1940 5 Sheets-Sheet 2

INVENTOR
Edward A. White
BY
Carl H. Crawford
ATTORNEY

Dec. 15, 1942.  E. A. WHITE  2,305,212

FRUIT SIZING MECHANISM

Filed March 20, 1940  5 Sheets—Sheet 5

INVENTOR
Edward A. White
BY
Carl H. Crawford
ATTORNEY

Patented Dec. 15, 1942

2,305,212

UNITED STATES PATENT OFFICE 2,305,212

FRUIT SIZING MECHANISM

Edward A. White, Clarkston, Wash.

Application March 20, 1940, Serial No. 325,001

10 Claims. (Cl. 209—121)

This invention relates to improvements in sizing mechanisms for fruit.

It is a primary feature of this invention to provide a novel advancing machine for sizing fruit, by weighing the same, and discharging fruit entities or integers of a predetermined weight, and at certain and predetermined points along the path of travel of the integers, so that integers of one weight can be delivered into one bin for receiving a given size fruit, and fruit of another weight will be delivered into a bin for that weight, and so on, until all the different size fruit entities have all been segregated into the respective bins provided therefor.

A very special feature consists in a machine that is designed to operate on the mass of fruit by handling individual integers singly and alone, instead of in groups, and to restrain the individual fruit integers against rolling movement while they are advancing through the machine so that such integers will at all times be in repose, or in other words, at rest.

In addition to the feature of always maintaining the fruit integers in repose, it is a further feature to maintain said integers in substantially fixed relation with respect to the machine during their successively changing positions necessary to passage through the machine, whereby I am able to employ a beam form of scale and insure that each fruit entity is deposited on the scale in a fixed location, so that the weight leverage will not vary, and hence an accurate weight can be obtained to a fraction of an ounce, thereby insuring a very precise accuracy in the performance of the sizing function.

It is also a feature of the invention to provide a novel form of scale which is equipped to form an essential part of the path of travel of the fruit entities through the machine, and which functions accordingly with its companion parts when a fruit integer is not heavy enough to actuate the scale, but which additionally functions to weigh and discharge an integer heavy enough to actuate the scale, and then instantly return to its companion function.

A further feature resides in a novel form of scale which is incorporated in the machine in such a manner that the scale weighs nothing except the fruit integer deposited thereon.

My invention involves a novel form of advancing means for handling the fruit integers individually, and which, in the preferred form, includes the weighing feature, but I also claim this novel advancing means, as such, irrespective of the manner in which the fruit may be weighed or otherwise sized.

For the primary purpose of gaining capacity it is a feature of my invention to provide a plurality of paths of travel for the fruit to be sized, and since it is desirable to avoid the necessity of providing a corresponding number of supply conveyers, it is a feature of my invention to divide the row of fruit integers, advanced on the usual supply belt, into as many rows as there are paths of travel in the machine, which in the preferred form is two.

My improved advancing means for the fruit involves a finger carrier having an orbital path of travel, and in the most improved installations, two complete machines are employed, and it is a feature to connect the carriers of the two machines with their actuating means in counterbalanced relation, to thereby reduce vibration to a minimum, which is a matter of vital importance because of the manner of individually handling the fruit, and by reason of the particular means of weighing the fruit.

My invention has many other features and objects which will be more fully described in connection with the accompanying drawings and which will be more particularly pointed out in and by the appended claims.

In the drawings.

Like characters of reference designate similar parts throughout the different figures of the drawings.

Figure 1:
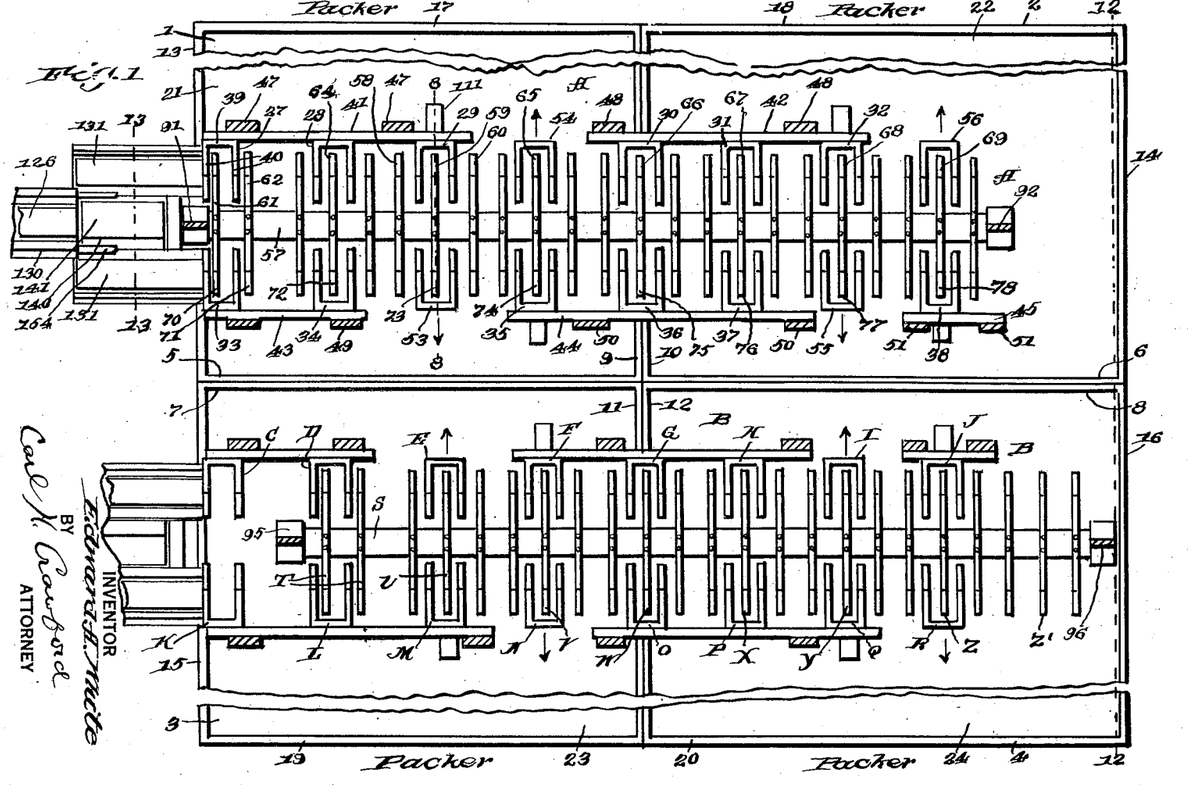
Fig. 1 is a plan sectional view on line 1—1 of Fig. 3, showing two complete machines and the receiving bins subjacent thereto.
Figure 11:
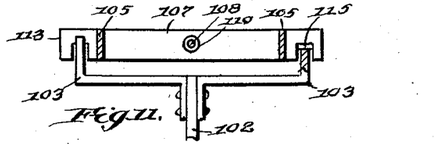
Fig. 11 is a sectional view on line 11—11 of Fig. 8, showing the knife edge construction of the scale.

In Fig. 1, I have shown two complete machines which I will generally designate as units A and B, and since both machines are identical in structure and function, only one need be described in detail but for convenience in the description of the operation, I will apply general reference designators to the parts of unit B. These machines are disposed over a plurality of receiving bins which are shown of exaggerated width to permit of clear illustration of the machine parts. I will designate these bins at 1, 2, 3 and 4, and they are shown disposed back to back, and in end to end relation, the back walls being indicated at 5, 6, 7 and 8, and the abutting end walls at 9, 10, 11 and 12, while the outer end walls are designated at 13, 14, 15 and 16, and the front walls are designated at 17, 18, 19 and 20. The bottom walls 21, 22, 23 and 24 slope downwardly from the back walls to the front walls, as shown in Fig. 11, and the bins are shown mounted on legs 25 and 26, and the packers stand abreast of the outer walls, as indicated by the legends "Packers." These bins are in common use and are not specifically claimed but have been described briefly to facilitate a later description of the manner in which the machines deliver to said bins. It may also be stated that the bottom walls of said bins slope downwardly and outwardly to enable the packer to reach the fruit with a minimum of effort. While I have shown only two bins in lengthwise disposition, in practice it will be understood that there may in some cases be as many as thirty bins in endwise disposition with each other.

Reference will next be made to that portion of the machine which I will term the advancing means whereby the fruit integers are advanced toward weighing means and discharged by the latter into the respective bins.

Referring to unit A, and to Fig. 1, I will first describe the two rows of non-advancing or stationary sets of supporting fingers, giving each a general reference numeral, and then I will specifically describe one of said sets of fingers. Since all of said sets of fingers are identical in form and function, a specific description of one will suffice.

Said sets of supporting fingers forming one row are designated at 27, 28, 29, 30, 31 and 32, and the sets of the opposite or companion row are designated at 33, 34, 35, 36, 37 and 38. Each set, as shown, consists of a rod belt into U-form and having a bight portion 39, and spaced fingers 40, which extend inwardly, or in other words, laterally of the length of the row.

Figure 6:
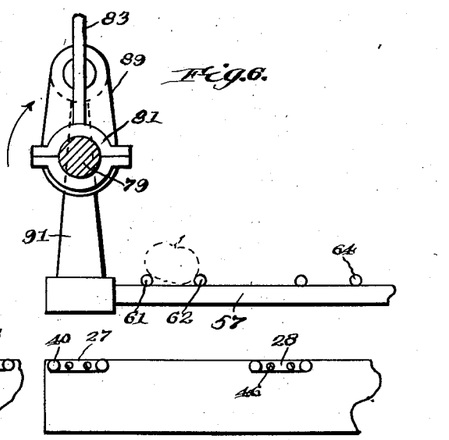
Fig. 6 is a similar view showing the beam elevated and with an integer carried thereon.

The bight portions 39 of said supporters may be rigidly secured to supporting bars 41, 42, 43, 44 and 45, by screws 46, or like means, as shown in Fig. 6, to rigidly hold the fingers in the laterally extending position shown. I have indicated at 47, 48, 49, 50, and 51, hangers which may be secured to the respective bars to suspend them from a suitable overhead anchorage, not shown.

The fruit supporters indicated at 53, 54, 55 and 56, which are movable, each form a part of novel weighing scales, to be later described, and are briefly referred to at this point to show that they do not interrupt, but on the contrary, form a continuation of the row of fruit supporting fingers which are stationary, and the scale fingers are identical in form and function to the stationary or non-advancing fingers previously described. Hereinafter I shall refer to the finger sets mounted on the scales, as the scale fingers.

At this point it is desirable to observe that the sets of scale fingers 53 and 54 are disposed over and deliver to bin 1, and also that set 53 delivers at one side of the machine, and set 54 delivers to the opposite side of the machine, as indicated by the arrows. Scale fingers 55 and 56 are disposed over bin 2 to deliver thereto, and are on opposite sides of the machine and deliver at opposite points as also indicated by the arrows. It will now be clear that the sets of fruit supporting fingers are horizontally disposed in parallel rows and are all non-advancing, or in other words, not movable lengthwise of the rows, although the sets of fingers of the scales are movable laterally, even though they never advance. The term "non-advancing" is used generically for all of said sets of fingers, rather than the term "stationary" because the scale fingers are not stationary.

Reference will next be made to that part of the machine which coacts with the rows of non-advancing sets of fingers.

A carrier, which is shown in the form of a beam 57 (Figs. 1, 2 and 3) is disposed between the two rows of supporting fingers and will, in practice, extend the full length of said rows for coaction therewith in forming the fruit advancing portion of the machine.

Said beam 57 carries a plurality of sets of laterally projecting fruit transferring or shifting fingers for coaction with said sets of fruit supporting fingers, there being one series or row of shifting fingers for each series or row of supporting fingers, and as all of the shifting fingers are identical in form and function only one set need be described in detail and the remaining sets will be designated by a general reference numeral.

Figure 2:
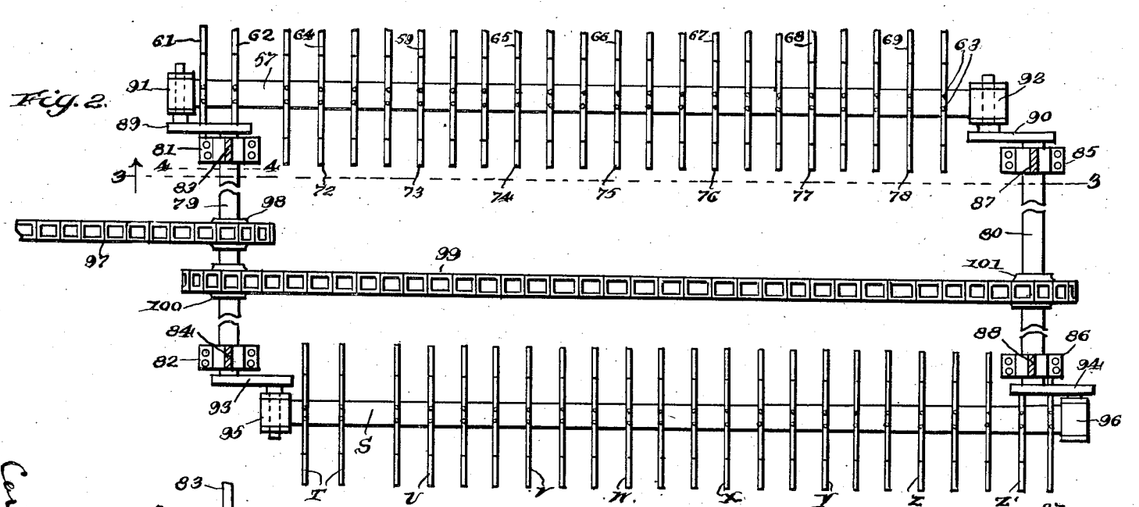
Fig. 2 is a plan sectional view on line 2—2 of Fig. 3, showing the two carrier beams and the manner in which they are connected up in counterbalanced relation with their actuating means, with the receiving bins and stationary portion of the advancing means omitted.
Figure 7:
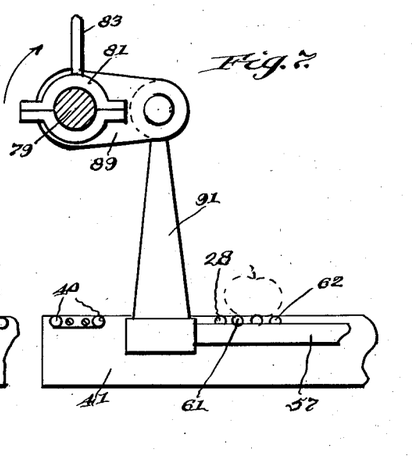
Fig. 7 is a similar view showing how the beam has advanced the integer from the Fig. 5 position and has deposited the integer in an advanced position.

Referring to Figs. 1, 2 and 7, it will be seen that these shifting fingers are in the form of rods 58, 59 and 60, and each set of shifting fingers consists of three fingers, except the first intake set indicated at 61 and 62, which consists of two fingers, for a reason to be later described. Said shifting fingers have their central portions welded, riveted or otherwise anchored to beam 57, as indicated at 63, and extend in opposite directions laterally of the length of said beam, and in this particular form of the invention the shifting fingers are so disposed and proportioned as to intermesh with said supporting fingers in the performance of certain operative functions to be later described. The first two shifting fingers 61 and 62 intermesh with the first set 27, the finger 61 being disposed between the supporting fingers 40 and finger 62, disposed laterally and rearwardly of the innermost supporting finger 40. Throughout the remainder of the machine the middle shifting finger, as 59, extends between two supporting fingers of sets 29 and 53, and fingers 58 and 60 are disposed outside said sets, as will be clear from Fig. 1.

Before describing a very special feature of all the fingers, I will first generally designate each set of shifting fingers, in addition to the two sets previously designated, and will associate each set of shifting fingers with the set of supporting fingers with which they coact. The general reference numerals for each set of shifting fingers will have their leading lines connected with the middle finger of each set, except the first set.

Shifting fingers 61 and 62 coact with supporting fingers 40 of set 27. Shifting finger set 64 coacts with supporting set 28, shifting set 59 coacts with supporting set 29, shifting set 65 coacts with scale fingers 54, shifting set 66 coacts with supporting set 30, shifting set 67 coacts with supporting set 31, shifting set 68 coacts with supporting set 32 and shifting set 69 coacts with scale fingers 56, all of which are on one side of the machine.

On the opposite side, shifting set comprising fingers 70 and 71 coacts with supporting set 33, set 72 coacts with set 34, set 73 coacts with scale finger 53, set 74 coacts with set 35, set 75 coacts with set 36, set 76 coacts with set 37, set 77 coacts with scale finger 55, and set 78 coacts with set 38.

By reason of the fact that accurate weight is necessary in order accurately to differentiate between different size fruit integers, and because the fruit integers are engaged and supported by both sets of fingers at spaced peripheral areas of the fruit integer, it is a most important feature of this invention to retain the integers against rolling movement, which is effective transversely of the fingers because of their lateral engagement with the integer, but which, in the preferred form, is also effective longitudinally of the fingers.

Figures 9, 12:
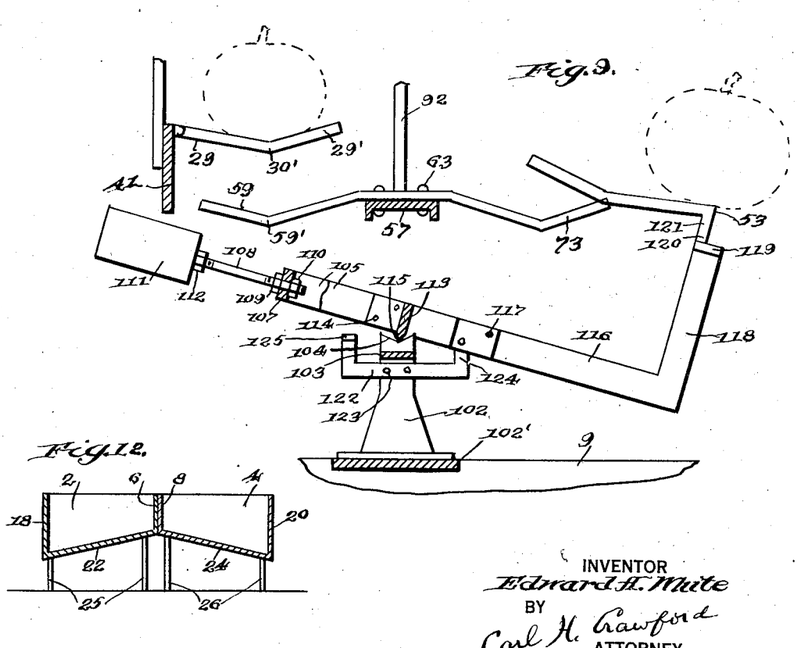
Fig. 9 is a view similar to Fig. 8, showing the scale actuated and how it discharges a weighed integer.
Fig. 12 is a transverse sectional view on line 12—12 of Fig. 1, showing the general construction of the receiving bins on a reduced scale.

Therefore, I have provided all the fingers with fruit retaining means and this feature is specifically embodied by imparting a downward bend which is clearly shown in Fig. 9. Thus the two fingers 29' of set 29 are bent downwardly at 30' in such a manner as to pocket the integer against rolling movement longitudinally of said fingers and retain the integer in a fixed location with respect to the fingers, both fingers being bent to the same extent.

Figure 16:
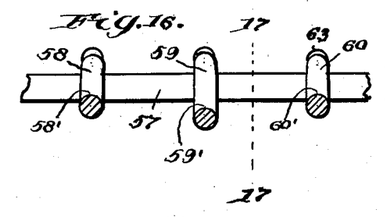
Fig. 16 is an enlarged sectional view of a set of shifting fingers taken on line 16—16 of Fig. 17.
Figure 17:
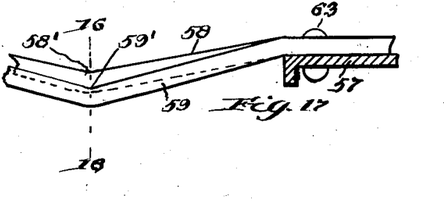
Fig. 17 is a sectional view on line 17—17 of Fig. 16.

The middle shifting finger 59 is also bent downwardly as indicated at 59' to form a similar fruit retaining or pocketing means. However, the outer fingers 58 and 60, as will be seen by reference to Figs. 16 and 17, are not dipped or bent to such an extent as the middle finger, and it will be clear that the pocketing portions 58' and 60' are slightly higher than the pocketing portion 59' of the middle finger.

Therefore it will now be clear that the fruit integers on both the supporting sets of fingers, and the shifting sets of fingers, will be retained against movement out of fixed locations, irrespective of whatever slight vibration the machine may have, and in spite of the fact that many of the integers must pass some considerable distance through the advancing means.

As machine unit B is in all respects identical with unit A, it will merely be necessary to very generally designate the parts of unit B.

The supporting fingers of one row are designated at C to J', and the supporting fingers of the remaining row are designated at K to R, and they are supported in the identical manner as are the identical fingers illustrated in unit A. The beam of unit B is designated at S, and it will be merely necessary to designate the sets of rods forming the shifting fingers of both rows on this unit B by single reference letters T to Z', whereby the complete finger equipment will have been designated. The sets E and N are scale fingers that discharge into bin 3, and sets I and R, are scale fingers that discharge into bin 4, and these scale sets are disposed in a manner identical with those of machine unit A, previously described.

In order that the fruit integers may be advanced in the advancing means, it is necessary that the beam 57 be actuated, and it is a feature of the invention to actuate said beam in a manner to pick up, and then shift, and finally deposit an integer in step by step advanced positions, and I will describe the means for actuating said beam.

However, at this point, it is desired to bring out the fact that my invention would be completely operative and effective if the advancing means consisted of one row of supporting fingers, and one row of shifting fingers, and that duplication into two rows of each for each machine is primarily for the purpose of increasing capacity. However, in addition to increasing the capacity, there is a very important feature in coupling up two machines which will be presently described.

Figure 3:
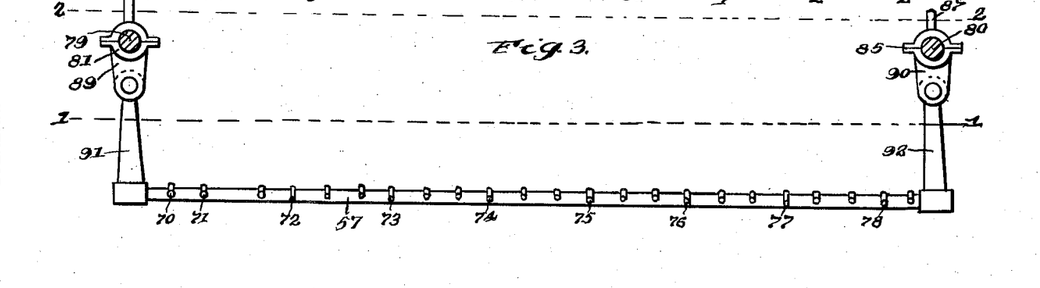
Fig. 3 is a sectional view on line 3—3 of Fig. 2, showing the carrying beam in a different position from that shown in Fig. 2.

Next referring to Figs. 2 and 3, I have shown driving shafts 79 and 80, which rotate about axes transverse, or at right angles to the longitudinal axes of beams 57 and S. Shaft 79 is shown journalled in bearings 81 and 82, which may be suspended from an overhead anchorage in any desired manner by hangers 83 and 84. Shaft 80 is journalled in bearings 85 and 86, which are likewise rigidly supported by hangers 87 and 88. Shafts 79 and 80 have cranks 89 and 90 which are pivotally connected to hangers 91 and 92, the lower ends of which are rigidly connected to the ends of beam 57. Shafts 79 and 80 have cranks 93 and 94, which are pivotally connected with the upper ends of hangers 95 and 96, having their lower ends rigidly connected with the ends of beam S, in a manner identical with hangers 91 and 92. Any suitable drive may be applied to drive shafts 79 and 80, in a clockwise direction, viewing Figs. 3 and 4, and at the same rate of speed, and I have shown a drive chain 97, trained over a sprocket 98, mounted on shaft 79. A drive chain 99 is trained about a sprocket 100, on shaft 79, and about sprocket 101, on shaft 80.

Now it will be observed that the cranks 89 and 90 are disposed in counter-balanced relation to cranks 93 and 94, or more specifically, the pairs of cranks are one hundred eighty degrees apart, whereby the momentum of beams 57 and S will be absorbed so that vibration will be reduced to a minimum. This is of very great importance in this apparatus wherein the fruit integers are carried by being loosely supported on the shifting and supporting fingers, and wherein it is desirable to retain the fruit integers against rolling movement on said fingers. It is further important because any appreciable or material degree of vibration might greatly impair the accuracy of the novel weighing scales.

Reference will next be made to one of the weighing scales as more particularly shown in Figs. 8, 9, 10 and 11.

Figure 10:
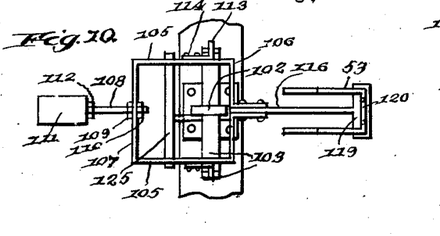
Fig. 10 is a plan view of the scale mechanism on a reduced scale.

On a suitable standard 102 are mounted arms 103 having V-shaped recesses 104, adapted to receive knife edges of a scale beam, said standard being mounted on a support 102', fixed to wall 9 of bin 1. As shown, said beam includes a rectangular frame having side, front and rear members 105, 106 and 107, respectively, as shown in Fig. 10. A threaded rod 108 extends through said rear member 107 and is held by nuts 109 and 110, and a counterweight 111 is adjustably mounted on said rod in any suitable manner, as by nut 112. Strips 113 are secured at 114 to side members 105, and are provided with knife edges 115 which seat in said recesses 104, and on which the scale beam is tiltable from the normal position shown in Fig. 8 to the weighing and dumping position shown in Fig. 9. It will be particularly noted that in addition to the standard being recessed at 104, the strips 113 are also recessed and extend downwardly on opposite sides of arms 103, below the actual knife edge engagement, as shown in Fig. 11. The beam includes a finger member having a normally horizontal limb 116 secured rigidly to the front frame member 106 at 117, and an upwardly extending member 118, having a base 119, to which the bight 120 of scale fingers 53 are rigidly mounted, said fingers being bent downwardly at 121 so that attachment can be made.

Means is provided for limiting tilting movement of the scale beam in either of two directions, and I have shown such means embodied in a bar 122, fixed to said standard 103 at 123. Said bar 122 has an upwardly extending stop 124 adapted to be engaged by beam member 116, and a transverse stop bar 125 (Fig. 9) adapted to be engaged by the said frame members 105, to limit movement of the beam to the normal position shown in Fig. 8.

At this point it is desired to emphasize the fact that the structure constituting the scale beam, just described, is wholly rigid and tilts as an entity in the total absence of any extraneous weighable or movable parts. And further, it is important to note that the scale weighs nothing but the fruit integer.

Reference will next be made to the means for supplying or feeding fruit to the machines thus far described, with reference to Figs. 1, 12, 13 and 14.

As the said supply means for both units A and B are identical in structure and function, only one need be described in detail, and I will refer specifically to the supply means delivering to unit A.

Figure 13:
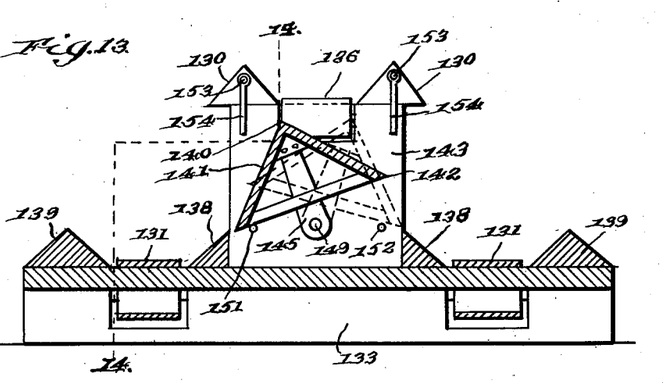
Fig. 13 is a transverse sectional view on an enlarged scale taken on line 13—13 of Fig. 1, and showing the row dividing means for the supply belt.
Figures 14, 15:
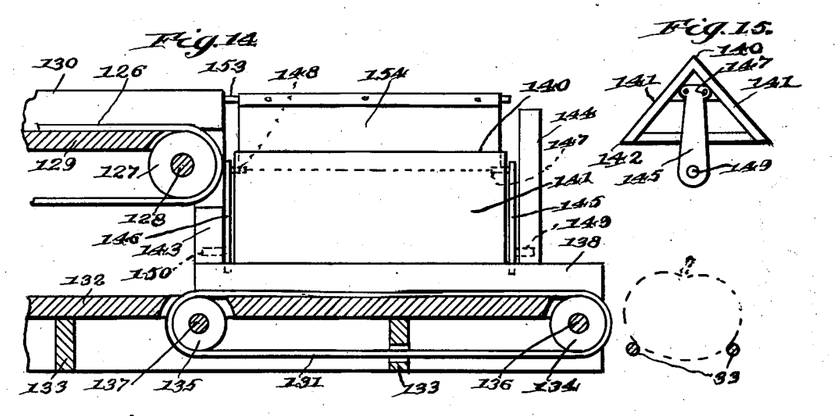
Fig. 14 is a sectional view on line 14—14 of Fig. 13, looking toward the right of the latter.
Fig. 15 is a view in end elevation of the divider.

A supply belt 126 is shown trained about a roller 127 mounted on a suitably journalled shaft 128, which will be driven in a clockwise direction, viewing Fig. 13, in any desired manner. The upper lap of said belt 126 travels on a support 129 between suitable guides 130, for the fruit. In its relation to this particular machine this belt 126 functions to advance previously sorted and graded fruit from the sorting tables, not shown, but in a broader phase of the invention it may be strictly a supply belt, as will be later described.

Reference will next be made to the novel means for dividing the row of fruit integers advanced by said belt 126.

Delivery belts 131 are disposed on opposite sides of said supply belt and in substantially parallel relation therewith, and at a substantially lower elevation therefrom. The upper laps of said delivery belts run on a platform 132 mounted on supports 133. Said delivery belts are trained over rollers 134 and 135, mounted on suitably journalled shafts 136 and 137, and the upper laps of said belts run between inner and outer fruit guides 138 and 139. It will be seen by reference to Fig. 1 that these delivery belts 131 are alined with the rows of supporting fingers of the advancing means for delivery thereto, and it will be clear from Fig. 14 that the first or nearest set of supporting fingers 33 are at a suitable elevation below the delivery end of the belt so that the integer will readily discharge onto said fingers, as indicated by dotted lines, it being understood that the rollers 134 and 135 are driven in a clockwise direction, viewing Fig. 14.

A row divider is disposed endwise beyond the supply belt 126, and below and in receiving relation to the same, and midway between said delivery belts 131, and in delivery relation thereto. Said divider is shown in end elevation in Fig. 15, and has a linear apex 140, side impact and actuating portions 141, and delivery edge portions 142, forming in cross section an acute angular body. This divider is disposed between the end wall 143, of the supply belt 126, and a terminal wall 144. The divider is mounted in a manner to cause the same always to gravitate automatically toward either of two extreme positions, as shown in full and dotted lines in Fig. 13. Said divider is provided with supporting links, one at each end thereof, as indicated at 145 and 146. At their upper ends said links are rigidly secured to the ends of said divider at 147 and 148. The lower end of link 145 is pivoted to terminal wall 144 at 149, and the lower end of link 146 is pivoted at 150 to end wall 143. Thus, the pivotal axis of said divider is relatively low and the center of gravity thereof is relatively high, hence the divider will always tend to overbalance in either of two directions.

In fact, said divider could only be in an equilibrium of balance when its apex 140 intersected a vertical line which also intersected the axes of pivots 149 and 150, which would be, at least, an accidental and not an operative position of the divider, and not a position which the divider could sustain. A stop 151 mounted on end wall 143 serves to limit rocking movement of the divider toward a delivery position to the left hand belt 131, as indicated by full lines, of Fig. 13, and a similar stop 152, mounted on wall 143, serves to limit rocking movement of said divider toward a delivery position to the right hand belt 131 of Fig. 13, as indicated by dotted lines.

At times an extra small size and light weight apple might fall too lightly or too rapidly to make its impact effective enough to shift the divider, and hence I have provided retarding means to prevent such ineffective operation.

As shown, I mount rods 153 in guides 130 so that they extend laterally along side of the divider. On these rods I mount flexible retarding leafs 154, which are interposed in the path of a fruit integer descending against an impact side 141 of the divider, to retard descent of the integer and thereby insure enough weight contact against an impact side 141 to tilt the divider.

The capacity and speed of supply belt 126 is sufficient to supply both rows of fruit supporters of one machine and it is the purpose of the divider to divide the row of fruit integers advanced by the supply belt into two rows, one for each delivery belt 131.

While I have shown this dividing means in connection with this particular machine, it will be understood that this dividing means is capable of functioning to advantage in any capacity in which it is desirable to divide a single advancing row of fruit integers into two rows.

While the operation of this machine may be clear from the foregoing description, it will be briefly recapitulated as follows:

First referring to the dividing means, it will be assumed that a fruit integer such as an apple has been discharged by the supply belt 126 onto the divider when the latter is in the full line position shown in Fig. 13, then in that event the apple will engage the right hand impact side 141. This engagement will be at a point laterally of a line intersecting the tilting axis, namely, pivots 149—150 and the apex 140, and consequently the weight of the apple, in addition to its impact, will shift or tilt the divider from the full line to the dotted line position of Fig. 13, and this will deflect the rolling apple onto the right hand delivery belt 131. This tilting movement will of course be arrested by the right hand stop 152. However, while the weight of the apple serves to shift the divider, the latter, while it is being shifted, serves to guide the apple onto the right hand belt 131, and the inner guiding strip 138 forms a continuation of the impact side 141 to guide the apple or fruit integer onto the belt.

It will now be clear that after the divider has been shifted over into the dotted line position shown in Fig. 13, it is then in a position to be actuated by, and shift the next fruit integer onto the left hand delivery belt 131. Thus each successive fruit integer tilts or reverses the position of the divider so that adjacent integers advanced by the supply belt are shifted to opposite delivery belts. In other words, the integers from the supply belt are alternately diverted to said delivery belts so that the latter will afford a uniform supply to the rows of fruit supporting fingers. It has been stated that the delivery belts 131 discharge onto the first set of non-advancing fruit supporting fingers of the respective rows, and of course the dividing means and advancing means will be operated in substantially timed relation so that the fruit will neither pile up or fail to charge the rows of fruit supporting fingers.

Reference will next be made to the fruit advancing means and the manner in which it operates, with special reference to Figs. 4, 5, 6 and 7.

Figure 4:
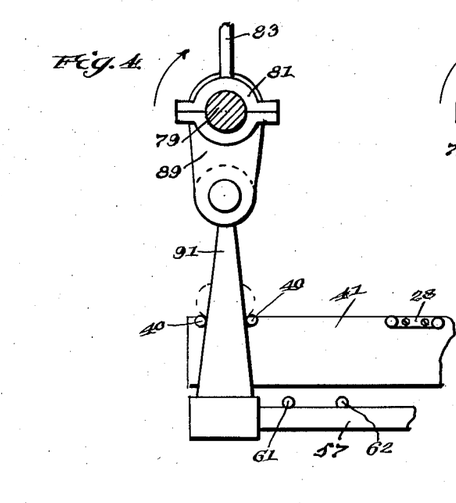
Fig. 4 is a fragmentary sectional view on line 4—4 of Fig. 2, showing the beam in a low position.

In these views I have shown on the supporting bar 41 the first two sets 27 and 28, of supporting fingers and on the beam 57 I have shown the first two shifting fingers 61 and 62. In Fig. 4 the crank 89 is in the down or lower position and an apple is shown supported in the two fingers 40 of the first set 27, which is the position it would occupy when discharged from one of the delivery belts 131.

Figure 5:
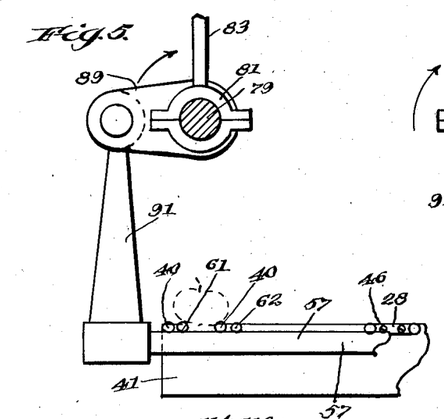
Fig. 5 is a similar view showing the beam in a pick-up position wherein the fruit integer is being engaged.

In Fig. 5 the crank 89 has made a quarter turn in a clockwise direction, as indicated by the arrow, and shifting finger 61 has assumed a position between fingers 40 and shifting finger 62 has assumed a position to the right of the remaining fingers 40. This is the pick up step in which the shifting fingers 61 and 62 have moved upwardly under the apple and into a position to pick it up, or in other words, lift it off from fingers 40 of the first set 27. Thus, it will be seen that while the apple may slightly shift its position as it is transferred from the fingers 40 to the shifting fingers 61 and 62, it does not and cannot have any rolling movement.

In Fig. 6 the crank 89 has made another quarter turn wherein the apple has been lifted above the first set of fingers 27, and has also been shifted to the right of the position it occupied in Fig. 5. Further, the first set 27 is now vacant and can receive another apple from its delivery belt 131.

In Fig. 7 I have shown the crank 89 at another quarter turn wherein it will be seen that the shifting fingers 61 and 62 have taken the same relative position with respect to set 28 that they did with respect to the first set 27, with shifting finger 61 between the fingers of set 28, and shifting finger 62 to the right of the remaining finger of set 28. Thus, the apple has been shifted into an advanced position of one step in the advancing means. Of course the step is consummated by continuous rotation of crank 89, together with its companion crank 90, which serves to maintain the beam 57 always in a horizontal position. Further, it will now be clear that the apple is always in repose, or in a position of rest during such advancing transfer step, and that it cannot have any rolling movement transversely of the length of the supporting sets of fingers, or the shifting sets of fingers since in both sets the apple is supportingly engaged at oppositely spaced peripheral areas thereof. Of course, the apple cannot have any rolling movement lengthwise of either the supporting or shifting fingers because of the retaining means which both are equipped with, and which is, specifically, the downwardly bent portions of said fingers. It is further emphasized that in this advancing movement the apple is always gently handled, not only when it is lifted off from one set of supporting fingers, but also when it is deposited onto the next set thereof, hence there is no possibility of the apple being bruised. Further, the apples are always individually handled, and because the pocketing or bent portions of the supporting and shifting fingers are in alined relation, as clearly shown in Fig. 8, the apples will always be held in fixed locations, or in other words, in fixed relation to the supporting and shifting fingers throughout the travel of the apples through the advancing means, so that it may accurately be stated that in such advancing movement, the apples travel in a straight advancing path.

The advancing steps will be the same as just described throughout the remaining length of the machine, and the fact that all of the remaining sets of shifting fingers each consist of three, instead of two fingers, will not alter or change the action just described. The only reason why the first shifting set has only two fingers is that the first set of supporting fingers must be disposed in close relation to the delivery belts 131 in order to get effective delivery, and if the first shifting set had three fingers this would require that one shifting finger would have to move into the space between the end of the delivery belt 131 and the first finger of the nearest supporting set.

It will be understood that the rows of apples advanced by this machine will be constantly depleted by the discharge effected by the weighing scales. The scales of which finger sets 53 and 54 form a part may be set to discharge apples of largest size into bin 1, and the scales of which finger sets 55 and 56 form a part may be set to discharge apples of the next smaller size into bin 2, and so forth, through as many bins as are being served. If, for instance, an apple of lighter weight is deposited on either set 53 or 54 than should be delivered to bin 1, then the scales will not be tilted and these sets of fingers will function merely as supporting fingers just the same as the stationary sets of fingers, and such apples will be advanced until they reach scale fingers where the scales are set to dump apples of that weight. Hence, it will be seen that apples of predetermined size will be discharged at predetermined points along the line of travel.

Figure 8:
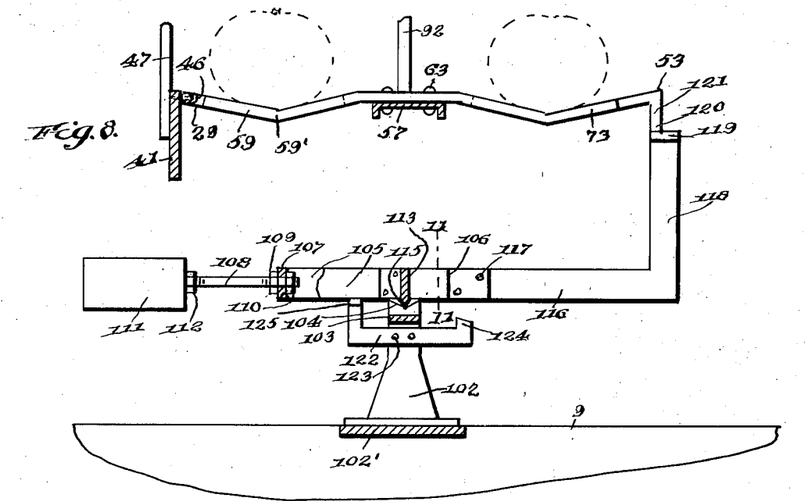
Fig. 8 is a sectional view on an enlarged scale taken on line 8—8 of Fig. 1, and looking toward the right thereof, and showing the scale mechanism in a normal unactuated position and in normal relation with its companion parts.

By reference to Figs. 8 and 9, it will be clear that when an apple is of sufficient weight to tilt the scale beam, the latter will tilt and discharge the apple in the manner shown in Fig. 9, laterally off from one side of the machine, which in this instance would be toward the rear wall 5 of bin 1. The shifting fingers will at this time be on their descending path of travel so as not to lift or interfere with the apple being discharged, as the speed of travel of the cranks 89 and 90 will be such that the shifting fingers will descend more rapidly than the scale fingers 53, in the tilting movement of the latter. In any event, the outer portions of scale fingers 53 will serve, in practice, to decline, as shown in Fig. 9, and cause the apple to roll clear from the end of the middle shifting finger, as it will be clear that the scale fingers 53 begin moving longitudinally or endwise away from the shifting fingers just as soon as the scale begins to tilt, and further, with just the right inclination of the fingers, the apple will begin to roll toward a discharging position just as soon as the scale has tilted to any appreciable extent. This rolling movement of the apple will therefore free the same from interference by the middle shifting finger, in any event.

If for any reason an apple lacked enough weight to tilt the scale, or only slightly, and not enough to cause discharge of the apple, the latter would be picked up on the next revolving step of the shifting fingers in the usual manner, and hence there is no possibility of the machine being clogged, or any chance that a shifting finger set might seek to deposit an apple onto a supporting finger set that was already occupied.

I now wish to point out the very great advantage of maintaining the fruit integers in fixed locations relative to the fingers, throughout their travel by the advancing means. Suppose an apple of lighter than maximum weight, which should be discharged into bin 2, were deposited onto scale fingers 53 near their laterally outer ends, then in that event the weight leverage on the scale beam would be greater than if the apple had been deposited on said fingers in the position shown in Fig. 8, and might actuate the scale and discharge such under-size apple into bin 1 instead of properly into bin 2. On the contrary, if an apple of maximum weight for bin 1 were deposited on the laterally inner ends of scale fingers 53 it might not actuate the scale. Thus, deposition of apples in the wrong bins would attain an inaccuracy far beyond the size tolerance permissible, and this size tolerance is now so exacting that a fraction of an ounce variance is objectionable.

Because of the fact that in this kind of machine a beam scale is the only form that is practical, the importance of retaining the fruit integers in substantially fixed locations with respect to the fingers will now be clear.

While the number of discharging scales shown for each bin is not essential to this invention, nor is it essential that the scales discharge on opposite sides of the machine, still I wish to point out a very great advantage that flows from the latter feature.

Even though the bottoms of the packing bins are inclined toward the packer, as shown in Fig. 12, it has been found in practice that if the fruit integers were all discharged from the machine at substantially one point, or on one side of the machine, they tend to, and actually do very often pile up instead of rolling down along the inclined bottom. Thus, if they pile up near the back of the bin, the packer must reach for the fruit and this slows up the packer's work.

While I have shown the finger shifting beams 57 and S actuated to move in a fixed orbit, which is specifically a revolving movement about the axes of shafts 79 and 80, still, the essential movement is broadly divided into three steps, namely, a pick-up, an advancing and a depositing movement, or such a movement that involves these steps.

Because of the previous description relative to individual handling of the fruit, and the importance of retaining the same in relatively fixed locations on the fingers, together with the requirements of accurate weighing, the great advantage of connecting the beams 57 and S of the two machines in counter-balanced relation to minimize vibration, will not only be clear, but it will be understood why this counter-balancing feature is so intimately related to this particular machine.

It will be clear that the supporting and weighing fingers or elements, as well as the shifting fingers or elements, are all individual, and that they perform their various functions individually on individual fruit or other types of integers. Thus, the shifting elements individually pick up, advance and deposit the integers from and to advanced elements. As a direct result of this novel structure, it is possible to equip each beam 57 with oppositely extending rows of shifting fingers or elements, each of which can coact with a row of supporting and weighing sets, thereby doubling the capacity of the machine without correspondingly increasing the weight thereof, especially the weight of the moving parts.

It will be clear that all the supporting fingers are not weighing fingers, and these additional supporting fingers greatly aid in affording the machine such a large capacity in sizing fruit. Hence, many integers will be shifted into advanced positions toward the scales but will not be released until they reach the scales that are set to release them. Therefore, there will be a succession of shifting steps which will be made solely for the extra capacity which this feature affords.

It will also be clear that the shifting fingers always follow one general character of movement or travel, irrespective of whether it is the orbital path specifically shown. In other words, this travel of the shifting fingers is always continuous instead of being intermittent, and is never interrupted by any kind of movement different from that of a continuous cycle of one general character, which explains the relatively higher speed of operation possible.

While I have shown one specific form of the invention, I do not wish to be limited thereto except for such limitations as the claims may import.

I claim:

1. In a mechanism for sizing fruit by weight, a row of laterally projecting sets of fruit supporting fingers and the fingers of each set being spaced to support a fruit integer thereon in repose and certain of said sets of supporting fingers comprising a part of releasing weighing scales for discharging integers of a given weight, a fruit advancing beam having a row of laterally projecting sets of fruit shifting fingers in intermeshing relation with said supporting fingers and each set of shifting fingers being adapted to support a fruit integer in repose thereon, and means for shifting said beam in up and down and endwise directions for consecutively advancing fruit integers in one general direction from one set of supporting fingers to the next set with the fruit integers in repose on and in substantially the same position relative to said shifting fingers throughout their advancing movement.

2. In a mechanism for sizing fruit by weight, a row of laterally projecting sets of fruit supporting fingers and the fingers of each set being spaced to support a fruit integer thereon in repose and certain of said sets comprising a part of releasing weighing scales for discharging integers of a given weight, a fruit advancing beam having a row of laterally projecting sets of fruit shifting fingers adapted to mesh with said supporting fingers and each set of shifting fingers being spaced to support a fruit integer in repose thereon, and means for actuating said beam in a plurality of directions for bringing said shifting fingers into and out of mesh relation with said supporting fingers to pick up and deposit fruit integers in one general direction of advance from one set of supporting fingers to the next set with the fruit integers in repose on and in substantially the same position relative to said shifting fingers throughout their advancing movement.

3. In a mechanism for advancing and sizing fruit by weight, a row of laterally projecting sets of fruit supporting fingers and the fingers of each set being spaced to support a fruit integer thereon in repose and certain of said sets comprising a part of weighing scales for discharging integers of a given weight, a fruit advancing beam having a row of laterally projecting sets of fruit shifting fingers adapted to mesh with said supporting fingers and each set of shifting fingers being spaced to support a fruit integer in repose thereon, and means for rotating said beam about axes transverse to its length for bringing said shifting fingers into and out of mesh relation with said supporting fingers to pick up and deposit fruit integers in one general direction of advance from one set of supporting fingers to the next set with the fruit integers in repose on and in substantially the same individual positions throughout their advancing movement relative to said shifting fingers.

4. In a mechanism for advancing and sizing fruit by weight, a row of laterally projecting sets of fruit supporting fingers and the fingers of each set being spaced to support a fruit integer in repose thereon, a fruit advancing beam having a row of laterally projecting sets of fruit shifting fingers adapted to mesh with said supporting fingers and each set of shifting fingers being spaced to support a fruit integer in repose thereon, means for actuating said beam through an orbit for bringing said shifting fingers into and out of mesh relation with said supporting fingers to pick up and deposit fruit integers in one general direction of advance from one set of supporting fingers to the next set, receiving bins below said fingers each to receive one weight fruit, and certain of said supporting fingers comprising a part of releasing scales to weight and release fruit of predetermined weight in predetermined bins.

5. In a mechanism for dividing a row of sorted fruit and sizing the latter by weight, a conveyer for conveying a row of previously sorted and graded fruit integers, a row dividing means for dividing said row into two rows, a pair of delivery belts for advancing the divided integers, a row of non-advancing fruit supporting fingers in receiving relation to each of said delivery belts and certain of said fingers of each row comprising a part of releasing scales for weighing and releasing fruit integers of given weights and the fingers of said rows extending inwardly toward each other, a carrier beam disposed between said rows of supporting fingers and having a series of fruit shifting fingers projecting laterally from each side of said beam and one series being adapted for mesh coaction with one row of supporting fingers and the remaining series being adapted for mesh coaction with the remaining of supporting fingers, bins for receiving predetermined sized fruit released by said scales, and means for actuating said beam to cause said shifting fingers to pick up and deposit fruit integers from and onto successive supporting fingers to advance the fruit in one general direction.

6. In a mechanism for advancing and sizing a plurality of rows of fruit by weight, identical and parallel rows of non-advancing fruit supporting fingers and certain of the fingers of each row comprising a part of releasing scales for weighing and releasing fruit integers of given weights at laterally opposite points as the fruit is being advanced and the fingers of said parallel rows extending inwardly toward each other, a carrier beam between said rows of supporting fingers and having a series of fruit shifting fingers projecting laterally from each side of said beam and one series being adapted for mesh coaction with one row of supporting fingers and the remaining series being adapted for mesh coaction with the remaining row of supporting fingers, bins for receiving predetermined weights of fruit from said scales, and means for actuating said beam to cause said shifting fingers to pick up and deposit fruit integers from and onto successive supporting fingers to advance the fruit in one general direction.

7. In a mechanism for advancing fruit, a row of laterally projecting sets of supporting fingers and the fingers of each set being spaced to support a fruit integer in repose thereon, a fruit advancing beam having a row of laterally projecting sets of fruit shifting fingers adapted to intermesh with said supporting fingers and the fingers of each set of shifting fingers being spaced to support a fruit integer in repose thereon, and means for shifting said beam in up and down and endwise directions for picking up and depositing integers from one set of supporting fingers to the next set with the fruit integers in repose on said shifting fingers so as to advance the fruit in one general direction.

8. In a mechanism for advancing and sizing fruit by weight, a row of laterally projecting sets of fruit supporting fingers and the fingers of each set being spaced apart to support a fruit integer, beam scales distributed along and below said fingers with the beams thereof parallel with said fingers and each scale having a set of supporting fingers identical with and forming a part of said row and said scales being adapted to tilt and release an integer of a certain weight by gravity, said supporting fingers being bent downwardly between their ends to retain or pocket fruit integers against rolling lengthwise of said fingers from the position in which the integers were deposited thereon thereby making the weight leverage on said beam scales uniform, a fruit advancing carrier having a row of laterally projecting sets of fruit shifting fingers adapted to mesh with said supporting fingers and the fingers of each set of shifting fingers being spaced apart to support a fruit integer in repose thereon, and said shifting fingers being bent downwardly between their ends in registry with the downwardly bent portions of said supporting fingers to retain or pocket the fruit integers against rolling endwise of said shifting fingers and to deposit the integers on said supporting fingers in alinement with the position of the fruit when occupying said shifting fingers, and means for actuating said carrier for bringing said shifting fingers into and out of mesh relation with said supporting fingers to pick up and deposit fruit integers in one general direction of advance from one set of supporting fingers to the next set with the fruit integers always in repose on said fingers carrying the same.

9. In a mechanism for advancing and sizing fruit by weight, a row of pairs of laterally projecting fruit supporting fingers and the fingers of each pair being spaced apart to support a fruit integer, beam scales distributed along and below said row of fingers with the beams thereof parallel with said fingers and each scale having a pair of supporting fingers identical with and forming a part of said row and the scales being adapted to tilt and release an integer of a certain weight by gravity, said supporting fingers being bent downwardly between their ends to retain or pocket fruit integers against rolling lengthwise of said fingers from the initial deposited position thereon thereby making the weight leverage on said beam scales uniform, a fruit advancing carrier having a row of laterally projecting sets of fruit shifting or transfer fingers and the majority of said sets consisting each of three fingers, said shifting fingers being bent downwardly between their ends and the middle finger of each set having the greatest extent of bend and the downward bends of said shifting fingers being in alinement with similar bends of said supporting fingers to retain or pocket fruit integers on said shifting fingers against rolling movement endwise or laterally thereof, and means for actuating said carrier for bringing said shifting fingers into and out of mesh relation with said supporting fingers to pick up and transfer fruit integers in one general direction of advance from one pair of supporting fingers to the next pair with the fruit integers always in repose on said fingers carrying the same.

10. In a mechanism for advancing and sizing fruit integers by weight, a series of sets of fruit supporting fingers and the fingers of each set being spaced apart to support a fruit integer and certain of said fingers being weighing fingers for releasing fruit of a given weight and the remainder being supporting fingers, said supporting fingers being bent downwardly between their ends to retain an integer thereon against rolling movement endwise of said fingers, a series of sets of fruit advancing fingers adapted to mesh with said supporting fingers and the fingers of each set of shifting fingers being spaced apart to support a fruit integer thereon in repose, and said sets of shifting fingers being bent downwardly between their ends in registry with the downwardly bent portions of said supporting fingers to retain the fruit integers against rolling movement endwise of said shifting fingers and to deposit the integers onto said supporting fingers in alinement with the position of the fruit when occupying said shifting fingers, and means for actuating said shifting fingers into and out of mesh relation with said supporting fingers to pick up and deposit fruit integers along said supporting fingers with the integers always in repose on said fingers carrying the same.

EDWARD A. WHITE.